Figure 1:
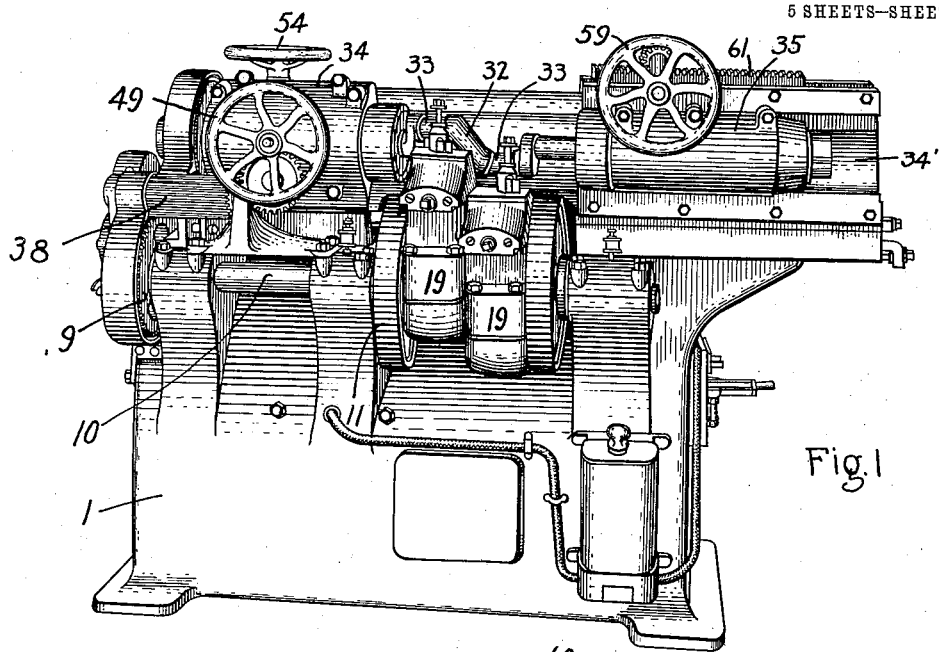

J. RIDDELL.
MACHINE FOR TURNING CRANK PINS.
APPLICATION FILED JULY 6, 1908.

1,011,849.

Patented Dec. 12, 1911.

5 SHEETS—SHEET 1.

Witnesses:
Lloyd C. Bush

Inventor:
John Riddell,
By
Att'y.

J. RIDDELL.
MACHINE FOR TURNING CRANK PINS.
APPLICATION FILED JULY 6, 1908.
1,011,849.
Patented Dec. 12, 1911.
5 SHEETS—SHEET 2.
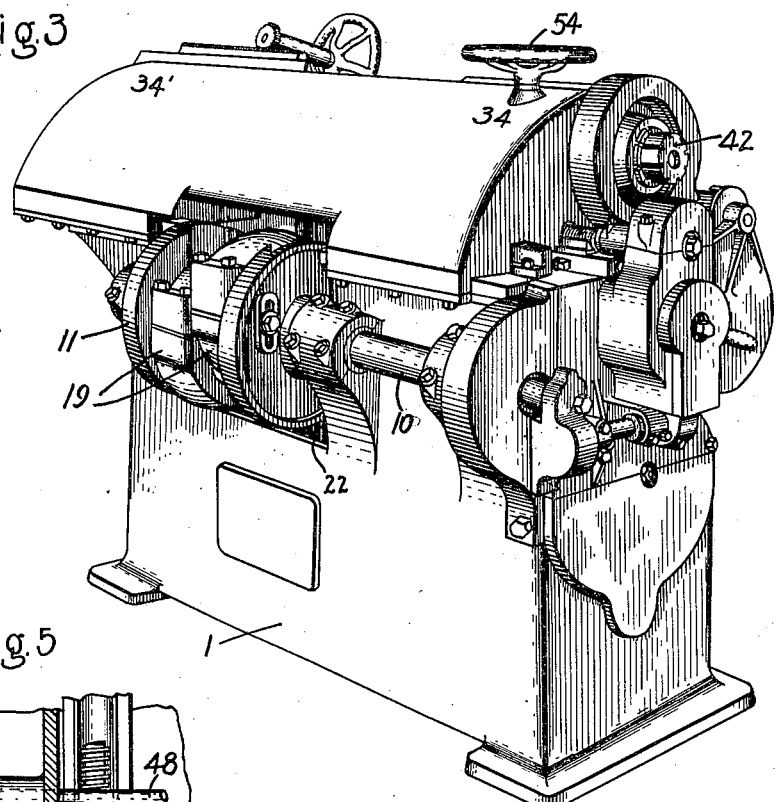
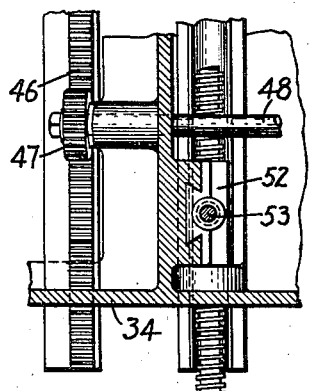
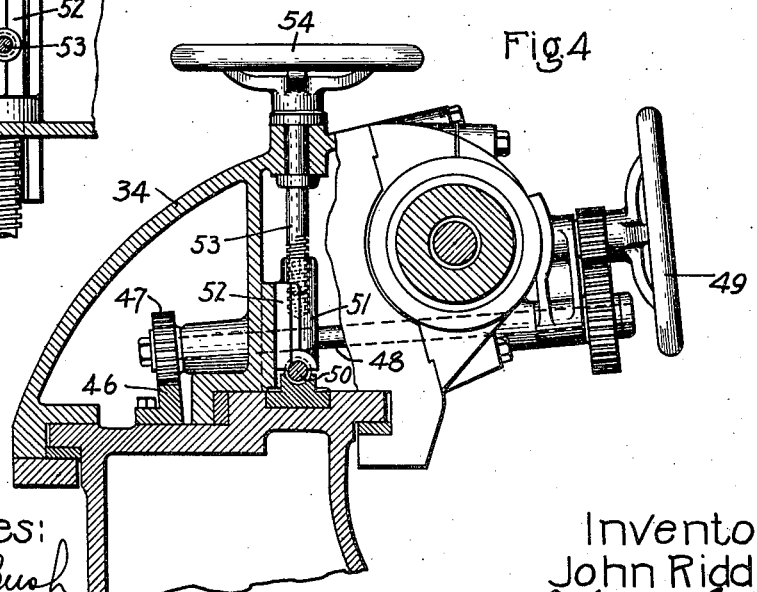
Witnesses:
Lloyd C. Bush
J. Ellis Glen
Inventor:
John Riddell,
By [signature],
Atty.

J. RIDDELL.
MACHINE FOR TURNING CRANK PINS.
APPLICATION FILED JULY 6, 1908.
1,011,849.
Patented Dec. 12, 1911.
5 SHEETS—SHEET 3.
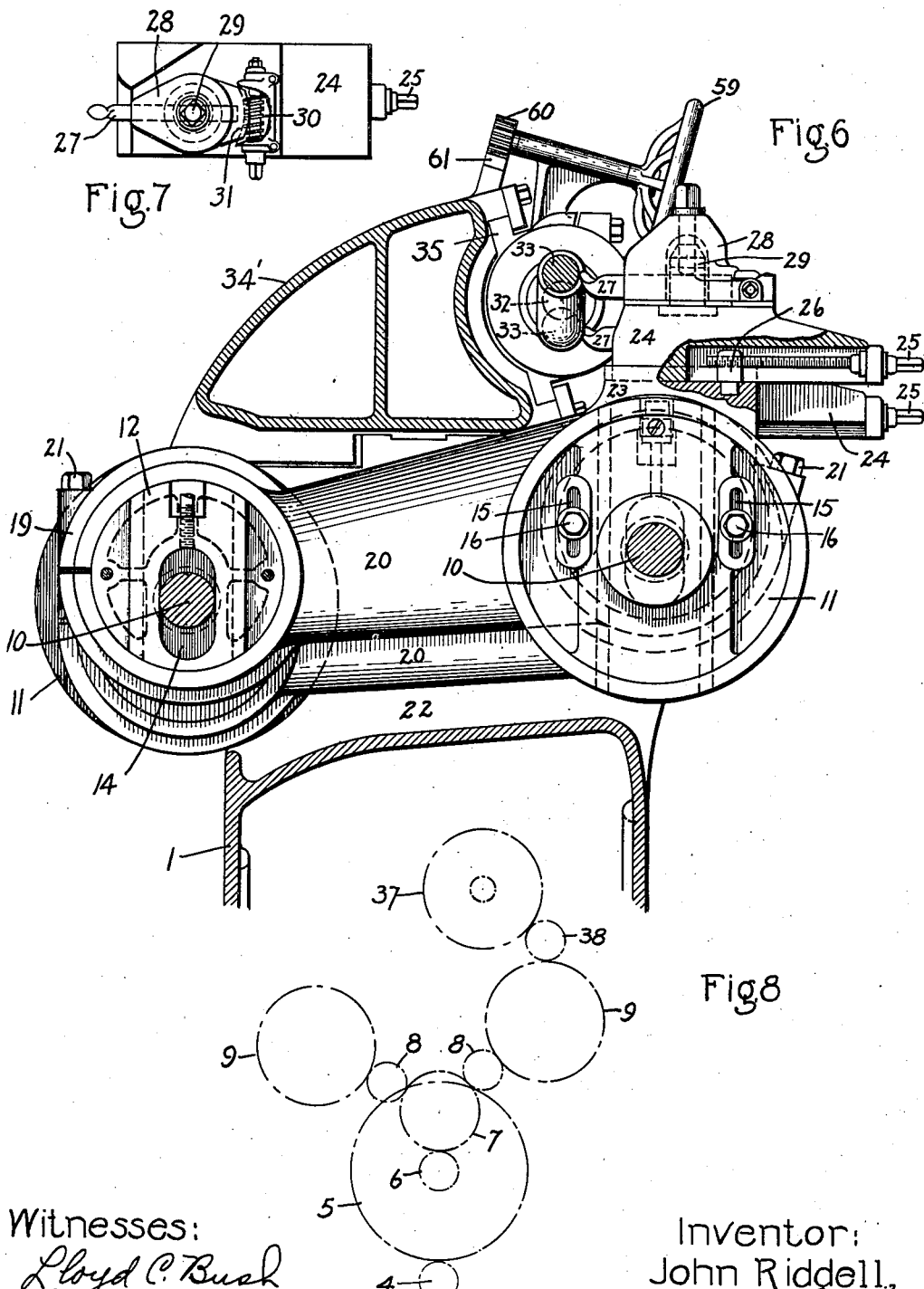
Witnesses:
Lloyd C. Bush
J. Ellis Glen
Inventor:
John Riddell,
By Albert G. Davis
Atty.

J. RIDDELL.
MACHINE FOR TURNING CRANK PINS.
APPLICATION FILED JULY 6, 1908.
1,011,849.
Patented Dec. 12, 1911.
5 SHEETS—SHEET 4.
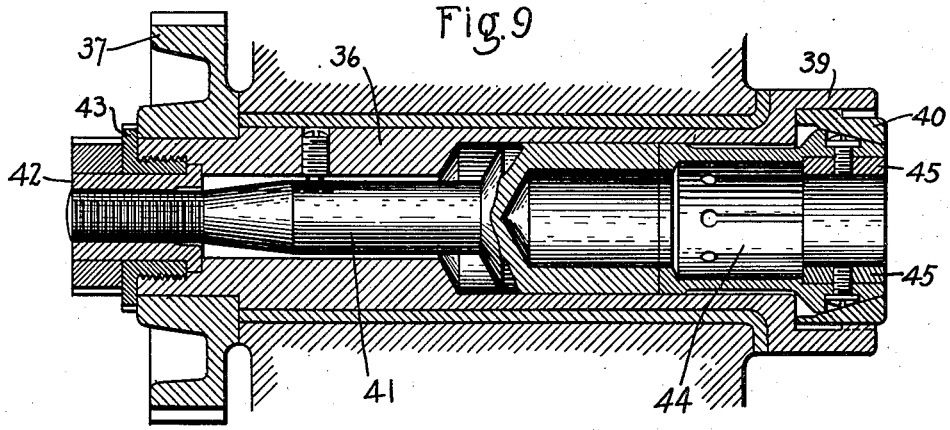
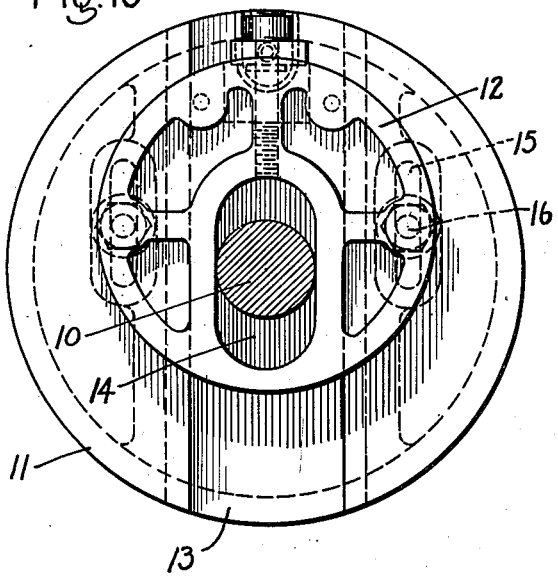
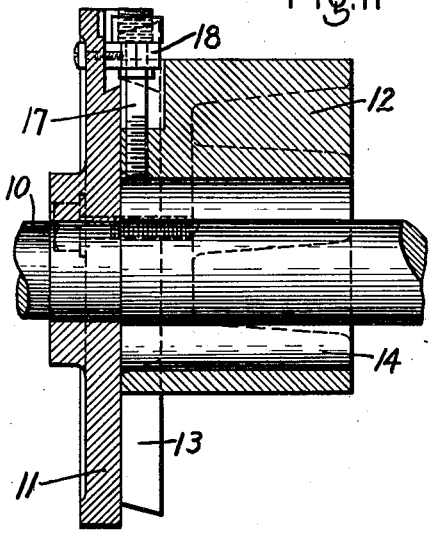
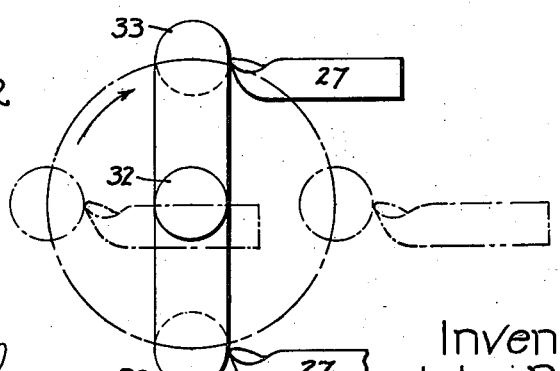
Witnesses:
Lloyd C. Bush
J. Ellis Ellen
Inventor:
John Riddell,
By Albert H. Davis
Atty.

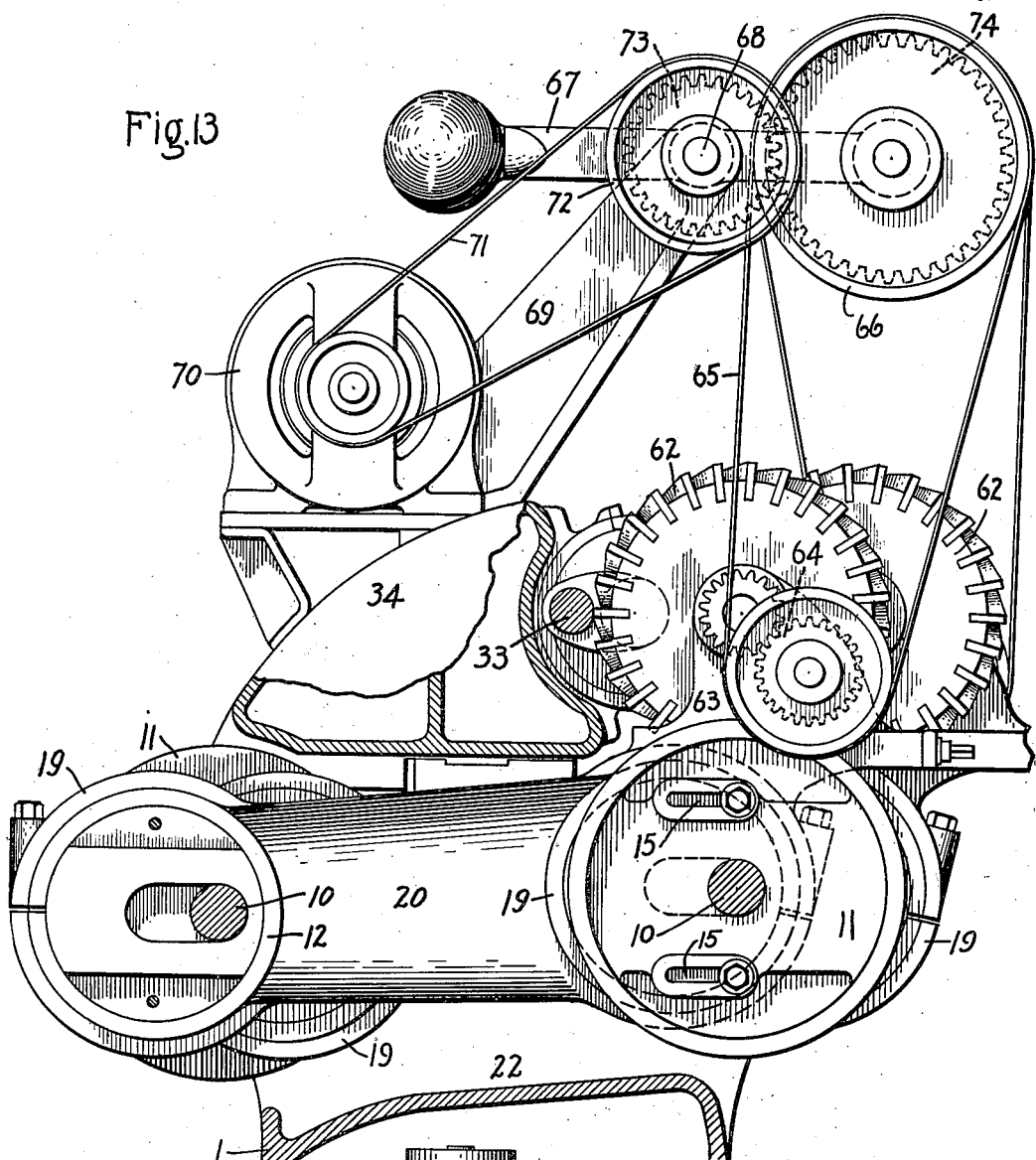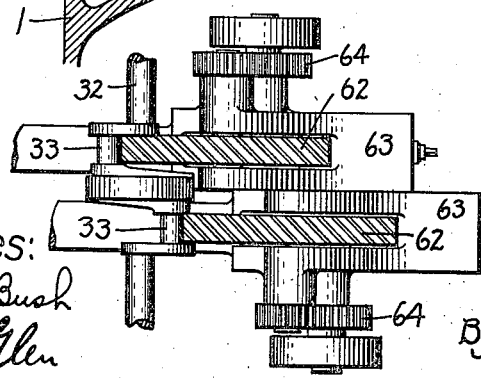

UNITED STATES PATENT OFFICE.

JOHN RIDDELL, OF SCHENECTADY, NEW YORK, ASSIGNOR TO GENERAL ELECTRIC COMPANY, A CORPORATION OF NEW YORK.

MACHINE FOR TURNING CRANK-PINS.

1,011,849.  Specification of Letters Patent.  Patented Dec. 12, 1911.

Application filed July 6, 1908. Serial No. 441,978.

*To all whom it may concern:*

Be it known that I, JOHN RIDDELL, a citizen of the United States, residing at Schenectady, county of Schenectady, State of New York, have invented certain new and useful Improvements in Machines for Turning Crank-Pins, of which the following is a specification.

This invention relates to machines for turning up the bearing surfaces of one or more cranks or wrist pins which are formed integral with the shaft. The ordinary mode of turning such pins is to chuck the shaft in a lathe with the axis of the pin in line with the lathe centers, and then use ordinary turning tools to do the work. This operation involves the revolution of a heavy shaft and crank arms eccentrically to the lathe centers, which tends to strain the machine, and is often an awkward thing to do owing to the size and weight of the work.

My invention aims to rotate the crank shaft on its own axis, thus avoiding any unbalanced parts, and enabling a crank of considerable throw to be handled in a moderately sized machine. In order to effect the machining of the crank pin, I cause the tool to follow the crank in its revolution, but keeping the tool at all times horizontal, with its nose in proper cutting relation to said pin. If desired, the lathe tool may be replaced by milling cutters or polishing wheels. The mechanism for effecting this comprises essentially two shafts parallel with the axis of the crank shaft to be machined, carrying eccentrics on which are mounted one or more carriers upon which the tool carriages are supported. The eccentrics impart to each carrier a movement like that of the side rod or parallel rod of a locomotive, and they can be adjusted so that the throw of each carrier corresponds exactly with that of the crank pin, thus insuring the proper movement of the turning tool, cutter or polishing wheel to keep it in working relation to said crank pin.

Figure 2:
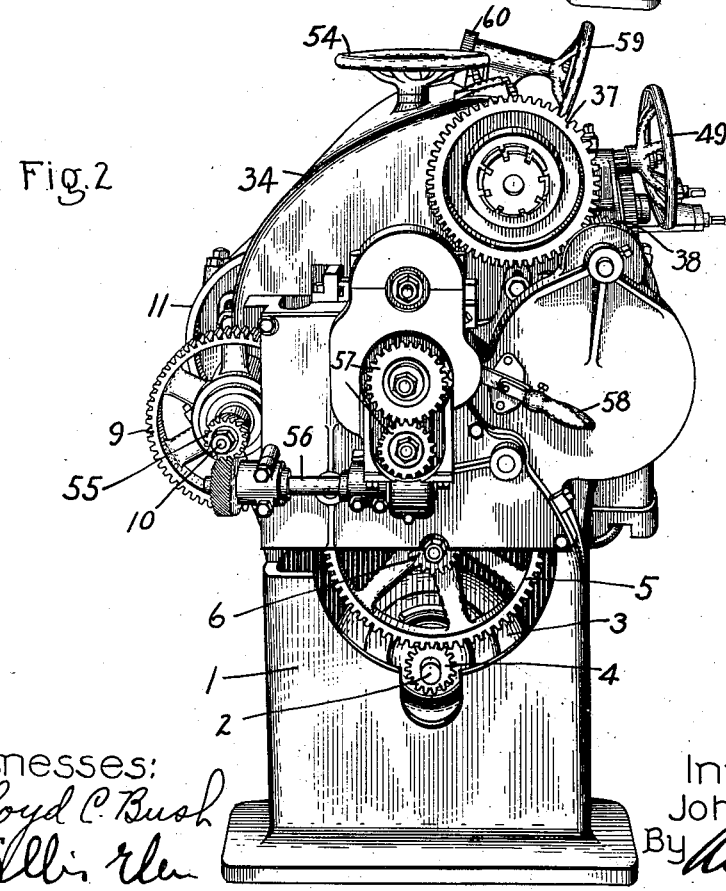

In the accompanying drawings, Figure 1 is a perspective front view of a crank pin turning machine embodying my invention; Fig. 2 is a perspective end view thereof; Fig. 3 is a perspective rear view; Fig. 4 is a cross section of the work-feeding devices; Fig. 5 is a plan view of a portion of said feeding-devices; Fig. 6 is a cross section of the machine showing the carriers and tools; Fig. 7 is a plan view of a tool carriage; Fig. 8 is a diagram of gearing; Fig. 9 is a longitudinal section of one of the chucks for holding the crank shaft; Fig. 10 is an elevation of one of the adjustable eccentrics; Fig. 11 is a cross section of the same; Fig. 12 is a diagram showing the positions of two crank pins and tools at different points in the revolution; Fig. 13 is a cross section of the machine showing milling cutters in place of turning tools; and Fig. 14 is an under plan view of said cutters.

The frame of the machine is preferably a box pedestal 1 which has great rigidity and firmness. In the lower position of this pedestal is housed a driving shaft 2 which is shown in the drawings as forming the armature shaft of an electric motor 3; though any other suitable means for conveying power to said shaft may be substituted for said motor, if desired. The shaft 2 carries a pinion 4, which by means of the reducing spur gear 5 and pinion 6 drives a gear 7. Two intermediate pinions 8 of the same diameter connect the gear 7 with two spur gears 9 also of the same diameter and mounted on the two parallel shafts 10, one at the front and one at the rear of the machine. The selected arrangement of gearing causes said shafts to be driven at the same speed. Each shaft carries a pair of circular disks 11 affording a means of support for an adjustable or shifting eccentric 12. By preference, the disk is provided with a diametrical dovetail groove 13 in which fits a corresponding diametrical rib on the eccentric. A central diametrical slot 14 in the eccentric permits it to be slid transverse to the shaft. A pair of slots 15 in the disk 11, parallel with the slot in the eccentric, and clamping bolts 16 passing through said slots 15 into the eccentric, enable the eccentric to be locked in position when adjusted. An accurate adjustment is provided for by means of a screw 17 rotating in a collar 18 secured to the disk; said screw being tapped into a portion of the eccentric in a direction parallel with the slot 14, whereby rotation of the screw will shift the eccentric transverse to the shaft.

The two eccentrics on one shaft 10 lie in the same two transverse planes as the two eccentrics on the other shaft, so that corresponding pairs on the two shafts can be engaged by the eccentric straps 19 on opposite ends of the two tool carriers 20, which are deep heavy bars, very solid and rigid. The straps can be tightened by means of the screws 21, in order to insure an accurate fit on the eccentrics. When the carriers are in place the transverse slots 14 in their eccentrics lie parallel with each other.

The carriers extend transverse to the shafts and the pedestal, which preferably has a gap or drop 22 to accommodate them. At their front ends, each carrier has an upwardly extending table 23 on whose top rests a tool carriage 24, which can be fed toward and away from the work by a screw 25 meshing in a nut 26 fixed on the table. The tool 27 is held in a tool post 28, being preferably arranged to turn laterally on an upright pivot 29; adjustment being effected by a worm 30 meshing with a segment worm gear 31 on the heel of the tool.

The crank shaft 32, whose crank pin or pins 33 are to be turned, is mounted in rotatable chucks in the headstock 34 and tailstock 35 of the machine; the latter being longitudinally adjustable on an extension 34' of the former. These chucks are duplicates, the construction of one of them being shown in Fig. 9. The tubular spindle 36 is suitably journaled and carries at one end a gear wheel 37 by which it can be rotated; said gear being driven by a pinion 38 meshing with the gear 9 on the front shaft 10. The gear 37 is of the same diameter as the gears 9, so that the spindle rotates at the same speed as the shafts 10. At the end opposite the gear wheel, the spindle has a countersunk head 39 in which is secured an internally conical ring 40. A shank 41 is splined in the spindle being adjustable lengthwise therein by means of its screw-threaded outer end and a nut 42; said nut being rotatably held in the spindle by a gland 43 screwing into said spindle and engaging a flange on the nut. The opposite end of the shank is enlarged and bored out to form a socket to receive the end of the crank shaft. The extremity of this socket portion or chuck 44 is conical to fit the conical ring 40, and the walls of the socket are slotted longitudinally to form jaws which can be compressed upon the shaft to clamp it by forcing the chuck outwardly by means of the nut 42. The jaws of the chuck may have reinforcing pieces 45 if desired.

The feed of the tool along the crank pin is effected by causing the headstock, carrying the tailstock, to slide along the bed of the machine; thus moving the work past the end of the tool instead of feeding the tool along the work. For feeding by hand, a stationary rack 46 is arranged adjacent to the headstock, running parallel with the line of feed. A pinion 47 meshes with this rack and can be rotated by a shaft 48 geared to a hand wheel 49. For power feed, a screw 50 is journaled in bearings in the pedestal, and a half nut 51 is mounted on a slide 52 secured to the headstock and adjustable up and down by a screw 53 and hand wheel 54. When slid down, the half nut meshes with the screw, so that if the latter is rotated the headstock will be actuated.

Mechanism for driving the feed screw is best shown in Fig. 2. A pinion 55 on the rear shaft 10 drives a shaft 56 extending partly across the end of the machine. A worm on this shaft actuates a train of gears 57 which rotate the screw 50. This train can be disconnected from the feed screw by a clutch operated by the handle 58.

In order to permit the headstock to slide along the bed without disengaging the gear 37 from the pinion 38, said pinion is made of considerable length, as shown in Fig. 1.

Provision is made for moving the tailstock up to and away from the work, consisting preferably of a hand wheel 59, pinion 60 and stationary rack 61 on the extension 34' of the headstock. This mechanism does not interfere with the travel of the tailstock when the work is being fed along by the hand or power feed operating on the headstock.

In operation, one end of the crank shaft, whose pin or pins is or are to be turned, is properly chucked in the headstock chuck, and the tailstock is then run up to receive in its chuck the other end of said shaft, which is thus mounted to revolve on its own axis. The shifting eccentrics are now set to give the tool carriers the same throw as that of the crank pins which are to be turned, and the adjustment is such that the eccentrics and the cranks all rotate in phase with each other. The tools in the tool-posts are then adjusted to the positions shown in Figs. 6 and 12, with their cutting edges in operative relation to the crank pins. On starting the machine, the tools will follow the cranks as shown in Fig. 12, so that in each revolution of the crank shaft, each pin will rotate in front of its tool and be turned thereby. The feed is effected, as has been explained before, by feeding the work past the end of the tool.

Instead of using an ordinary lathe tool 27, I may substitute milling cutters 62 (Figs. 13 and 14), journaled in standards 63 which are substituted for the tool-posts 28 in Fig. 6. Each cutter is suitably driven, as for instance by speed-gearing 64 connected by a belt 65 to a belt pulley 66 journaled in the end of a counterweighted lever 67, fulcrumed on a shaft 68 in a standard 69 erected on the headstock of the machine. An electric motor 70 is mounted on said bracket, and is connected by a belt 71 with a pulley 72 on the shaft 68. A gear 73 on said shaft meshes with one 74 on the shaft of the belt pulley 66, so that the cutters 62 will be constantly driven by said motor; the levers permitting the cutters to rise and fall alternately as they follow the rotatory movements of the crank pins.

Instead of milling cutters, I may use grinding or polishing or buffing wheels, as the nature of the work may demand.

What I claim as new and desire to secure by Letters Patent of the United States, is,—

1. A machine for turning a crank pin integral with a crank shaft, comprising means for rotating the shaft on its axis, a tool for operating on said pin, a carrier for said tool, and mechanism for imparting to said carrier the same movement as the crank pin.

2. A machine for turning a crank pin integral with a crank shaft, comprising means for rotating the shaft on its axis, a tool for operating on said pin, a carrier for said tool, a pair of parallel shafts, and means whereby said shafts impart to said carrier a parallel-rod movement in phase with said crank shaft.

3. A machine for turning a crank pin integral with a crank shaft, comprising means for rotating the shaft on its axis, a tool for operating on said pin, a pair of parallel shafts, eccentrics on said shafts, and a carrier for the tool mounted on said eccentrics.

4. A machine for turning a crank pin integral with a crank shaft, comprising means for rotating said shaft on its axis, a tool for operating on said pin, a pair of parallel shafts, shifting eccentrics on said shafts, and a tool carrier mounted on said eccentrics.

5. A machine for turning a crank pin integral with a crank shaft, comprising means for rotating said shaft on its axis, a tool for operating on said pin, a pair of parallel shafts, a disk on each shaft, an eccentric adjacent to each disk having a diametrical slot, means for clamping said eccentric to said disk, a carrier bar having an eccentric strap at each end fitting said eccentrics, and a support for the tool on said bar.

6. A machine for turning one or more crank pins integral with a crank shaft, comprising parallel shafts, eccentrics thereon, carrier bars mounted on said eccentrics, tools on said carrier bars, a headstock and tailstock for supporting the shaft, and means for feeding said headstock and tailstock axially.

7. A machine for turning one or more crank pins integral with a crank shaft, comprising parallel shafts, carrier bars, means whereby said shafts impart to said bars a parallel-rod movement, a headstock having an extension, a tailstock mounted to slide axially on said extension, and means for feeding said headstock axially.

8. In a device for turning the crank pins of crank shafts and the like, means for supporting the crank shaft, a pair of rotatable elements arranged in line with each other and said crank pin, a bar, journals connecting the bar with said rotatable elements, a tool carried by the end of the bar in contact with the crank pin to be turned, and means for rotating the crank shaft and said elements synchronously.

In witness whereof, I have hereunto set my hand this 2nd day of July, 1908.

JOHN RIDDELL.

Witnesses:
BENJAMIN B. HULL,
HELEN ORFORD.